United States Patent
D'Agostino et al.

(10) Patent No.: US 8,351,700 B2
(45) Date of Patent: Jan. 8, 2013

(54) VARIABLE GLYPH SYSTEM AND METHOD

(75) Inventors: Eloise Bune D'Agostino, New York, NY (US); Michael Bennett D'Agostino, New York, NY (US); Bryan Michael Minor, Mount Vernon, WA (US); Tamas Frajka, Seattle, WA (US); Michel Francois Pettigrew, Edgewood, WA (US)

(73) Assignee: Gracious Eloise, Inc., New York, NY (US)

( * ) Notice: Subject to any disclaimer, the term of this patent is extended or adjusted under 35 U.S.C. 154(b) by 386 days.

(21) Appl. No.: 12/756,970

(22) Filed: Apr. 8, 2010

(65) Prior Publication Data

US 2010/0260420 A1      Oct. 14, 2010

Related U.S. Application Data

(60) Provisional application No. 61/167,768, filed on Apr. 8, 2009.

(51) Int. Cl.
 *G06K 9/34* (2006.01)
(52) U.S. Cl. .................. 382/176; 382/173; 382/179
(58) Field of Classification Search .............. 382/176, 382/186, 187, 189, 159, 276, 317, 173, 179; 358/1.15, 462; 345/173, 179; 715/256, 863
See application file for complete search history.

(56) References Cited

U.S. PATENT DOCUMENTS

| | | | |
|---|---|---|---|
| 5,631,984 A * | 5/1997 | Graf et al. ................ | 382/317 |
| 6,940,617 B2 * | 9/2005 | Ma et al. .................. | 358/1.15 |
| 8,005,294 B2 * | 8/2011 | Kundu et al. ............. | 382/159 |

* cited by examiner

*Primary Examiner* — Anh Hong Do
(74) *Attorney, Agent, or Firm* — Æon Law; Adam L. K. Philipp

(57) ABSTRACT

Using methods, computer-readable storage media, and apparatuses for computer-implemented processing, an image of handwritten text may be segmented into a disjoint component image corresponding to individual glyphs connected by ligatures. The disjoint component image is skeletonized into a grid graph, and a connected path traversing the ligatures is determined. The disjoint component image is segmented into non-overlapping segments based on connected graphs corresponding to edges in the disjoint component image, where sets of adjacent non-overlapping segments correspond to the individual glyphs. Glyph geometry may be varied by obtaining an ensemble of glyph representations, each characterized by measurable geometric glyph properties. For each geometric glyph property, target values are obtained from ensemble-wide statistical distribution functions, and the target values are used to transform a base glyph representation into a target glyph representation.

21 Claims, 19 Drawing Sheets

```
Ordered set 35 = {(1), (2, 3, 4, 5), (6), (7), (8), (9)}
 n = 1  fMin = 0.703292
 n = 2  fMin = 5.6712
 n = 3  fMin = 14.2357
 n = 4  fMin = 2.56946
 n = 5  fMin = 1.08216
 n = 6  fMin = 0.497651
```

```
metric = 24.7595

Ordered set 36 = {(1, 2), (3), (4), (5), (6), (7, 8, 9)}
Ordered set 37 = {(1, 2), (3), (4), (5), (6, 7), (8, 9)}
Ordered set 38 = {(1, 2), (3), (4), (5), (6, 7, 8), (9)}
Ordered set 39 = {(1, 2), (3), (4), (5, 6), (7), (8, 9)}
Ordered set 40 = {(1, 2), (3), (4), (5, 6), (7, 8), (9)}
Ordered set 41 = {(1, 2), (3), (4), (5, 6, 7), (8), (9)}
Ordered set 42 = {(1, 2), (3), (4, 5), (6), (7), (8, 9)}
Ordered set 43 = {(1, 2), (3), (4, 5), (6), (7, 8), (9)}
Ordered set 44 = {(1, 2), (3), (4, 5), (6, 7), (8), (9)}
Ordered set 45 = {(1, 2), (3), (4, 5, 6), (7), (8), (9)}
Ordered set 46 = {(1, 2), (3, 4), (5), (6), (7), (8, 9)}
Ordered set 47 = {(1, 2), (3, 4), (5), (6), (7, 8), (9)}
Ordered set 48 = {(1, 2), (3, 4), (5), (6, 7), (8), (9)}
Ordered set 49 = {(1, 2), (3, 4), (5, 6), (7), (8), (9)}
Ordered set 50 = {(1, 2), (3, 4, 5), (6), (7), (8), (9)}
Ordered set 51 = {(1, 2, 3), (4), (5), (6), (7), (8, 9)}
Ordered set 52 = {(1, 2, 3), (4), (5), (6), (7, 8), (9)}
Ordered set 53 = {(1, 2, 3), (4), (5), (6, 7), (8), (9)}
Ordered set 54 = {(1, 2, 3), (4), (5, 6), (7), (8), (9)}
Ordered set 55 = {(1, 2, 3), (4, 5), (6), (7), (8), (9)}
Ordered set 56 = {(1, 2, 3, 4), (5), (6), (7), (8), (9)}
```

*Fig.14*

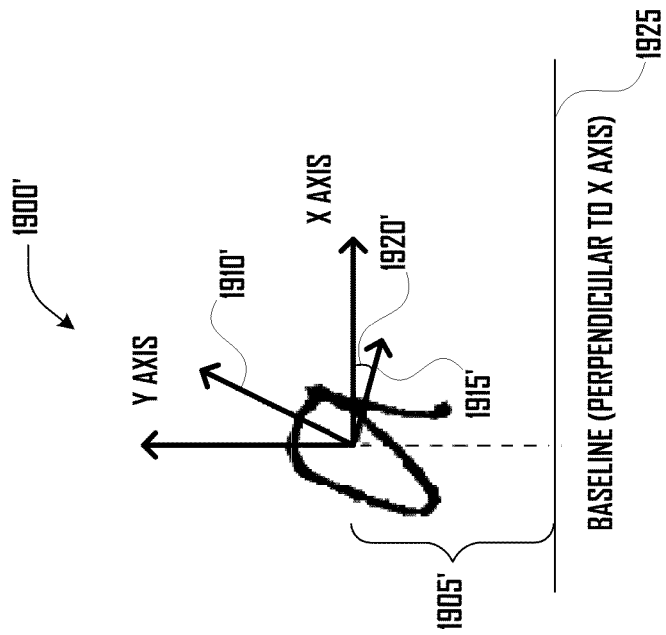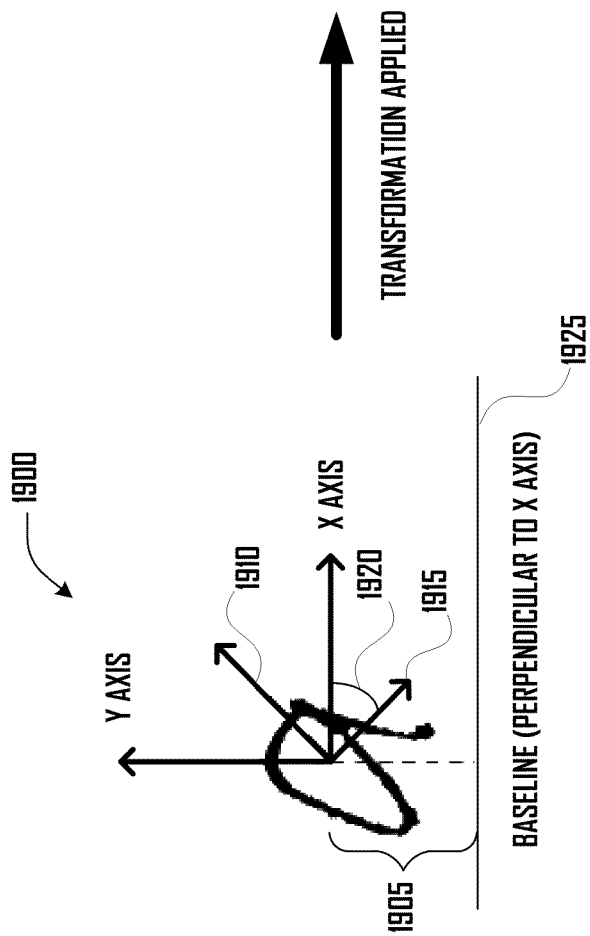
Fig. 19

VARIABLE GLYPH SYSTEM AND METHOD

CROSS REFERENCE TO RELATED APPLICATIONS

This application claims the benefit of priority to U.S. Provisional Application No. 61/167,768, filed Apr. 8, 2009; titled "WORD SEGMENTATION SYSTEM AND METHOD"; naming inventors Eloise D'Agostino, Michael D'Agostino, Bryan Minor, Tamas Frajka, and Michel Pettigrew. The above-cited application is incorporated herein by reference in its entirety, for all purposes.

FIELD

The present invention relates to computer handwriting analysis and synthesis, and in particular to methods for automatic word segmentation and glyph variation.

BACKGROUND

Since the advent of desktop publishing in the mid-1980s, it has become increasingly easy to use commonly-available software to create and print letters, cards, documents, and other printed matter. Moreover, at the present time, a computer user may have scores or even hundreds of high-quality fonts installed on his or her computer, with thousands of additional free and commercial fonts available via the Internet. As a result, many people have become accustomed to receiving printed materials that are not hand-written. Indeed, hand-written notes and cards may signal to a recipient a sense of importance and particular care because the sender personally took the effort to hand-craft the message.

There are numerous fonts that are intended to mimic generic handwriting to a certain extent. There are even services that will create a font to mimic a particular person's handwriting. However, existing personalized-handwriting fonts may appear mechanical and/or unnatural because individual glyphs may always be printed with identical geometry, whereas in an actual hand-written document, each individual character may have its own subtly unique geometry. Moreover, existing personalized-handwriting fonts and personalized-handwriting-font-creation services may have difficulty isolating individual glyph within a sample of cursive handwriting or other handwriting in which adjacent letters may be connected to one another.

BRIEF DESCRIPTION OF THE DRAWINGS

FIGS. 14-16 illustrate simulations with the illustrative pattern recognition routine for the word "Lapdog" in accordance with one embodiment.

FIG. 19 illustrates an exemplary transformation applied to a base glyph representation in accordance with one embodiment.

DESCRIPTION

Figure 1:
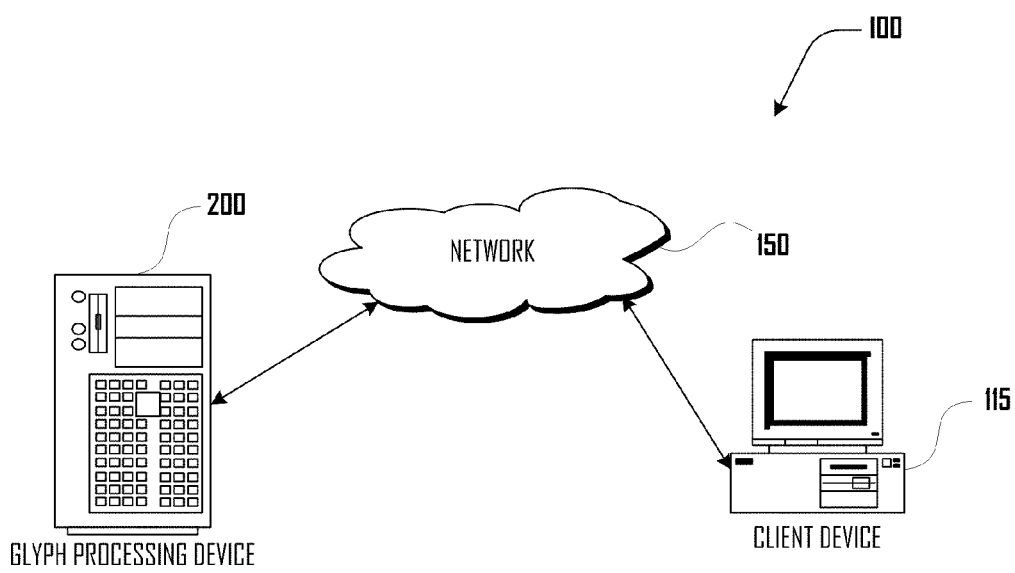
FIG. 1 illustrates an exemplary variable glyph processing system in accordance with one embodiment.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file Servers, computer Servers and memory storage devices. Each of these conventional distributed computing components is accessible by the processor via a communication network.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 illustrates an exemplary variable glyph processing system 100 in which a client device 115 and a variable glyph processing server 200 are connected to a network 150. In some embodiments, some or all of variable glyph processing server 200 and client device 115, may be incorporated into a single logical or physical device. As used herein, the term "glyph" refers to a symbol, letter, number, or other graphic or typographical representation.

In various embodiments, network 150 may include the Internet, a local area network ("LAN"), a wide area network ("WAN"), and/or other data network. In some embodiments, there may be multiple client devices 115 and/or multiple variable glyph processing servers 200.

Figure 2:
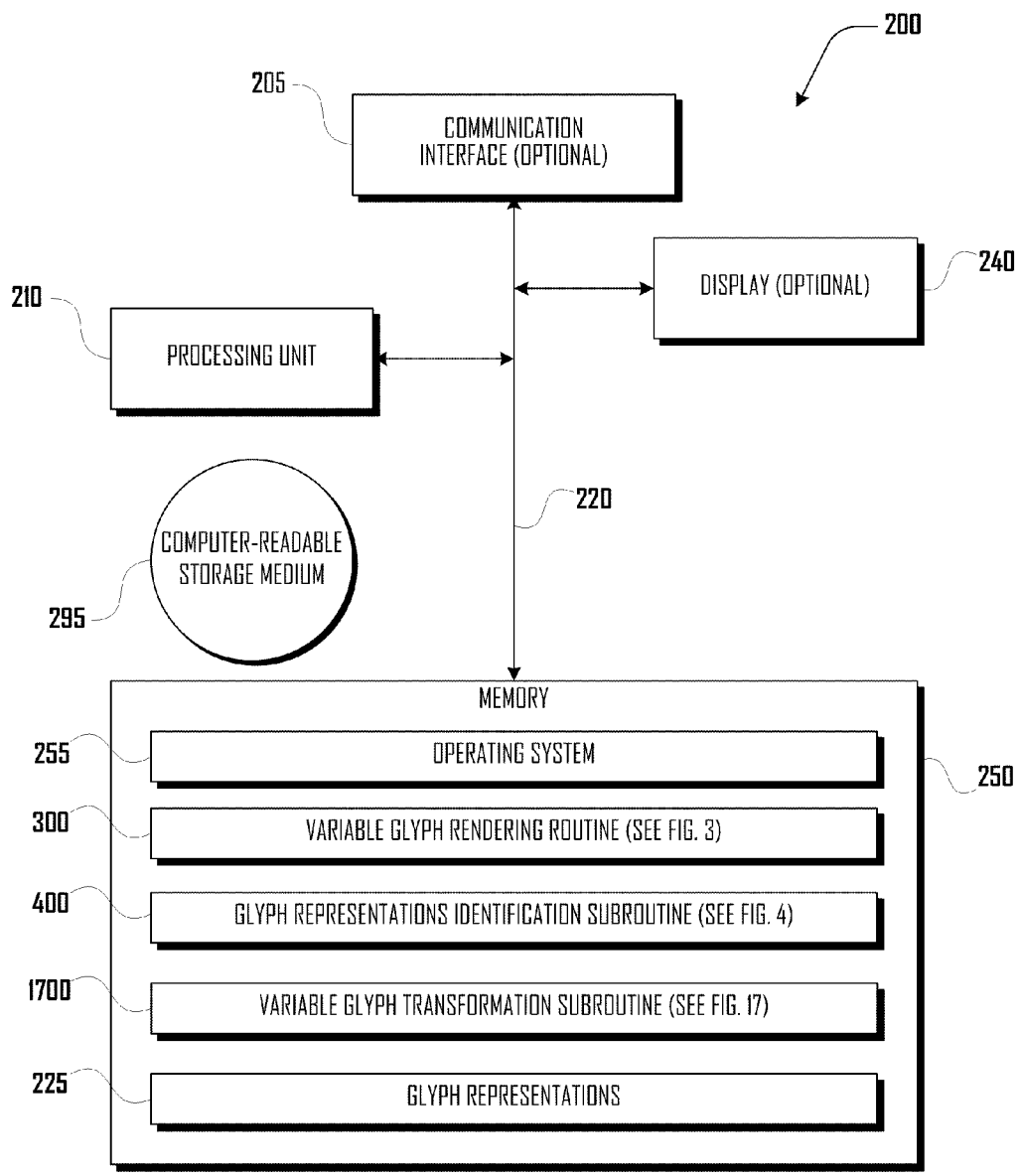
FIG. 2 illustrates several components of an exemplary variable glyph processing device in accordance with one embodiment.

FIG. 2 illustrates several components of an exemplary variable glyph processing device 200. In some embodiments, variable glyph processing device 200 may include many more components than those shown in FIG. 2. However, it is not necessary that all of these generally conventional components be shown in order to disclose an illustrative embodiment. As shown in FIG. 2, the variable glyph processing device 200 includes an optional communication interface 205 for connecting to a network.

The variable glyph processing server 200 also includes a processing unit 210, a memory 250, and an optional display 240, all interconnected along with the communication interface 205 via a bus 220. Memory 250 generally comprises a random access memory ("RAM"), a read only memory ("ROM"), and a permanent mass storage device, such as a disk drive. The memory 250 stores program code for a variable glyph rendering routine 300, a glyph representations identification subroutine 400, a variable glyph transformation routine 1700, and store 125 of glyph representations. In addition, the memory 250 also stores an operating system 255. These software components may be loaded from a computer readable storage medium 295 into memory 250 of the variable glyph processing server 200 using a drive mechanism (not shown) associated with a computer readable storage medium, such as a floppy disc, tape, DVD/CD-ROM drive, memory card, or the like. In some embodiments, software components may also be loaded via the communication interface 205, rather than via a computer readable storage medium 295.

Although an exemplary variable glyph processing server 200 has been described that generally conforms to conventional general purpose computing devices, an variable glyph processing server 200 may be any of a great number of devices capable of communicating with the network 150 and/or client device 115, for example, a personal computer, a game console, a set-top box, a handheld computer, a cell phone, a cloud computing service, or any other device that is capable of processing variable glyph data.

Figure 3:
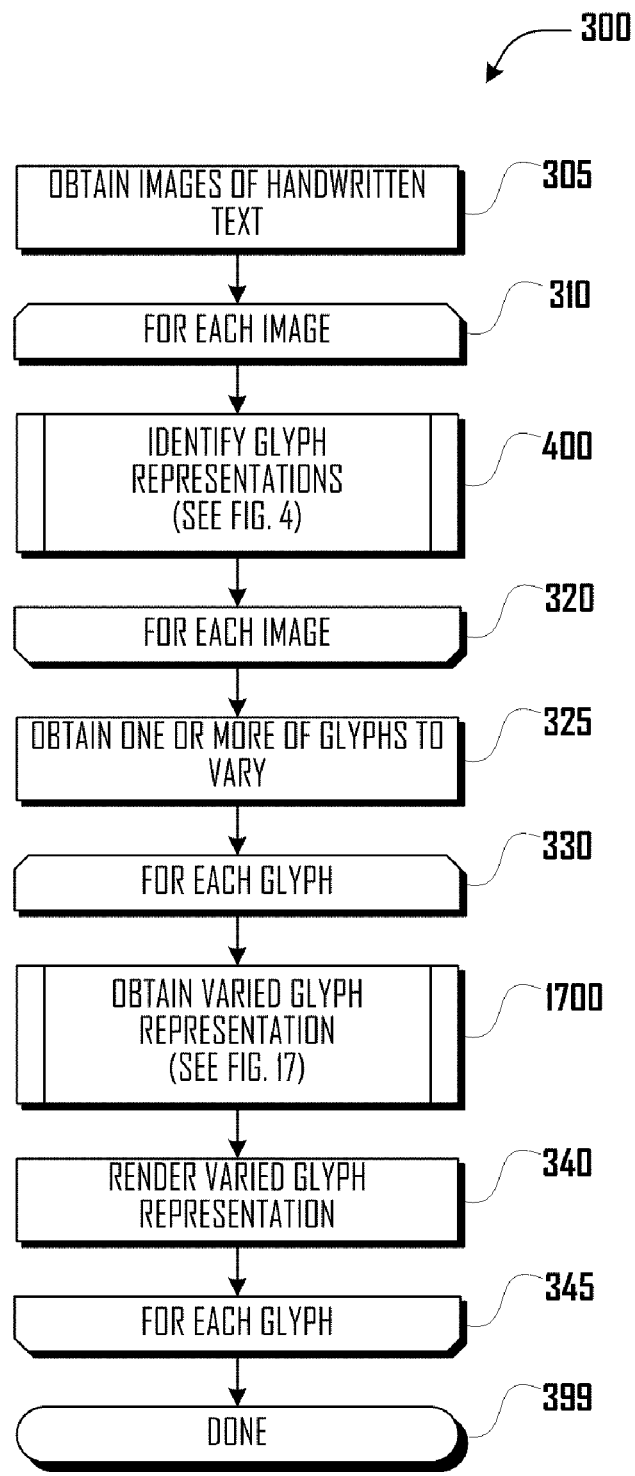
FIG. 3 illustrates a glyph representations identification routine in accordance with one embodiment.

FIG. 3 illustrates a glyph-representations identification routine 300 in accordance with one embodiment. In block 305, routine 300 obtains one or more images of handwritten text. In one embodiment, the one or more images of handwritten text may be scanned or otherwise acquired by client device 115 and conveyed to variable glyph processing device 200 via network 150 or other means. In one embodiment, 1200 dpi may be a suitable scanning resolution, but other resolutions may be used in other embodiments. Other embodiments may employ alternate means of acquiring an image of handwritten text. For example, an image may be acquired from a picture taken by a camera or by a camera component of a multipurpose device (e.g., a mobile phone with integrated camera).

Beginning in block 310, routine 300 processes each obtained image of handwritten text in turn. In subroutine block 400, routine 300 calls glyph representation identification subroutine 400 (see FIG. 4, discussed below) to identify glyph representations within the current image of handwritten text. In block 320, routine 300 cycles back to block 310 to process the next image of handwritten text (if any). This and other processes are described herein as iterative processes for clarity of explanation, but in other embodiments, processes may be performed in parallel and/or according to control structures other than iteration.

In block 325, routine 300 obtains one or more glyphs to vary. For example, routine may obtain a passage of text and/or a string of characters to render in variable glyphs. Beginning in block 330, routine 300 processes each glyph. In subroutine block 1700, routine 300 calls variable glyph transformation routine 1700 (see FIG. 17, discussed below) to obtain a varied representation for the current glyph.

In block 340, routine 300 renders the varied glyph representation. For example, in one embodiment, routine 300 may output the varied glyph representation to a screen, printer, or other graphical output device. In other embodiments, routine 300 may output the varied glyph representation to a file for further processing. In block 345, routine 300 cycles back to block 330 to process the next glyph (if any). Routine 300 ends at block 399.

Figure 4:
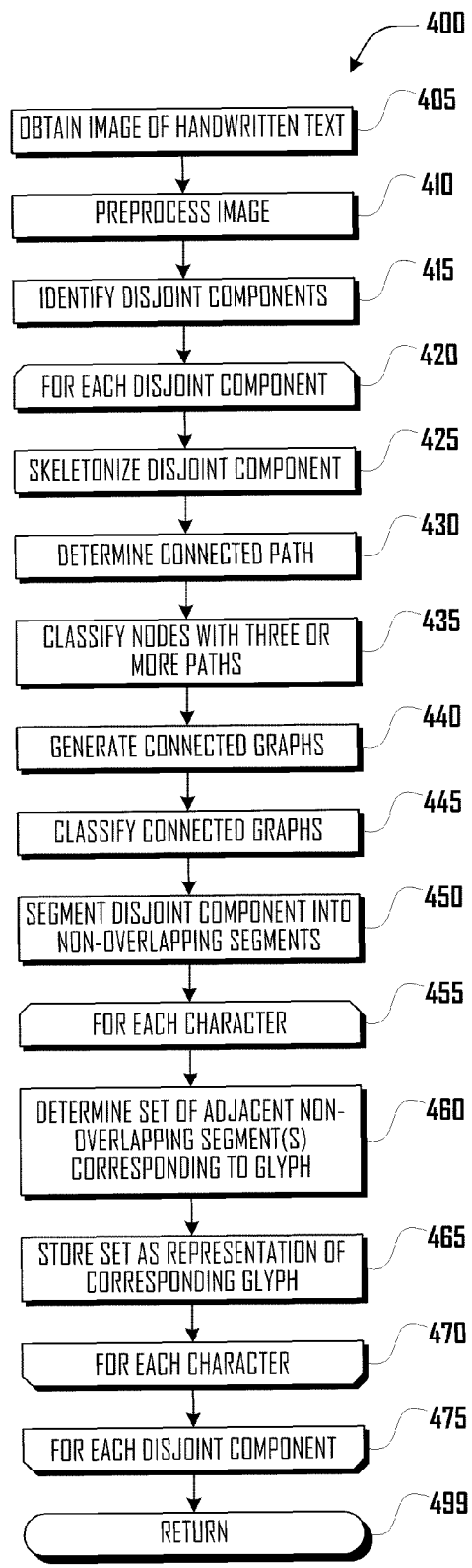
FIG. 4 illustrates a glyph representation identification subroutine in accordance with one embodiment.

FIG. 4 illustrates a glyph-representation identification subroutine 400 in accordance with one embodiment. In some embodiments, subroutine 400 may be related to the concept of "word segmentation." In the context of automated handwriting synthesis, "word segmentation" refers to the process of taking an image of a handwritten copy of a known word or text and matching segments of the image with the corresponding glyphs that make up the word. In various embodiments, word segmentation may allow for ligature identification in bigram formation and/or for the derivation of statistical information, e.g., from the isolation of individual glyphs, about variables that may characterize handwriting, such as the variability in glyph size, orientation, and spacing.

In block 405, subroutine 400 obtains an image of a handwritten copy of a known word or text, typically scanned or imaged at a suitable resolution (e.g., 1200 dpi, although other embodiments may use higher or lower resolutions). In one embodiment, the image may be passed in from a calling routine (e.g., see discussion of block 305 and 315 of FIG. 3, above). In block 410, subroutine 400 preprocesses the image. In one embodiment, the image of the word or text, is converted to a bitmap, or a corresponding set of "on" and "off" pixels.

In some embodiments, the bitmap may be further preprocessed according to one or more image processing routines (not shown). For example, in one embodiment, additional image processing routines include down sampling and filtering. Other embodiments may use more or fewer image processing routines. If used, the down sampling image processing algorithm may improve the efficiency of subroutine 400 while retaining at least some characteristics of the original bitmap. In one embodiment, down sampled bitmaps result in a 10-fold reduction in number of pixels. Other embodiments may down sample to a greater or lesser degree. In one embodiment, the bitmap is also filtered to remove artifacts that may have been introduced by the scanning or image capture process.

Figure 5:
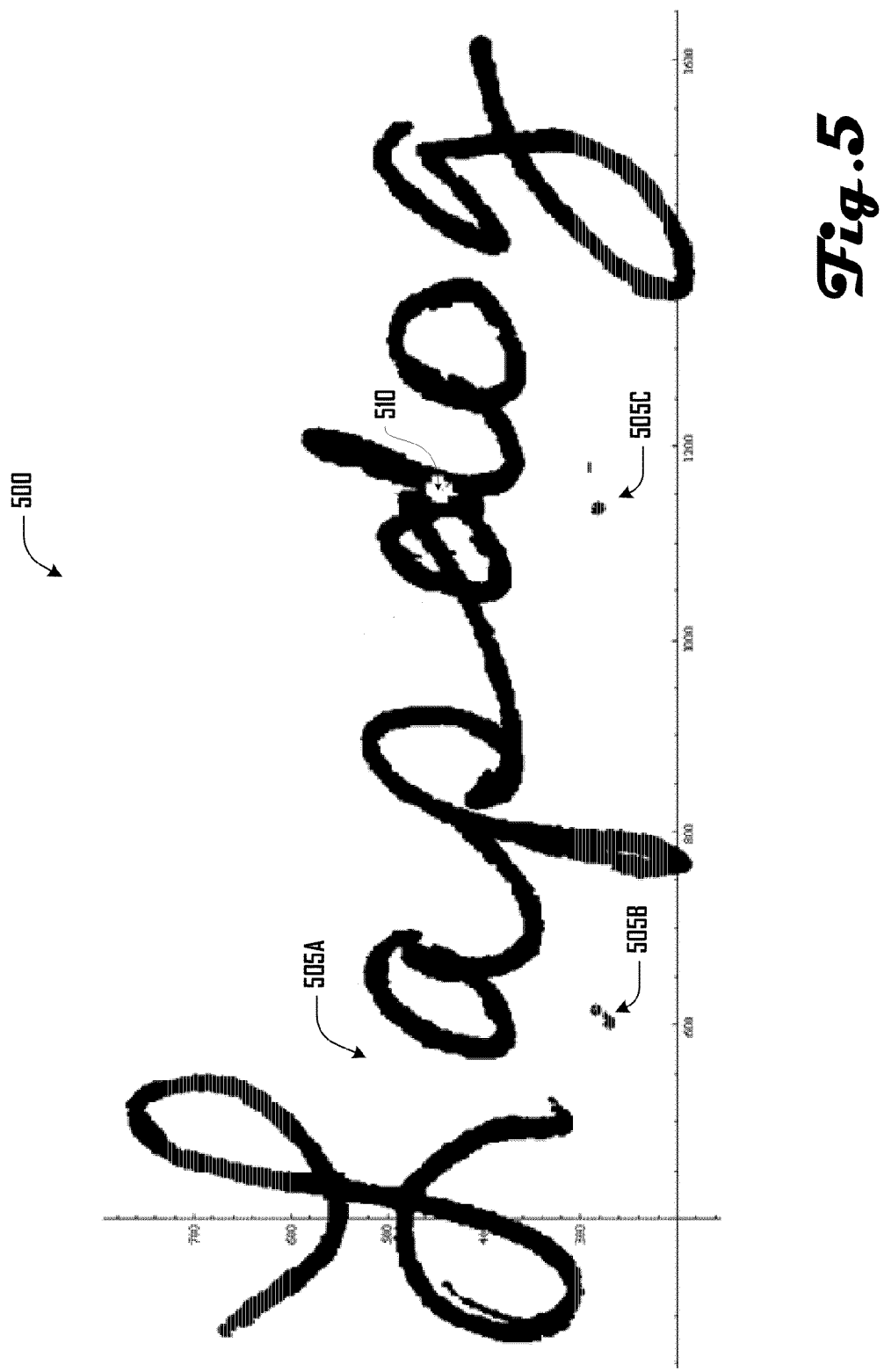
FIG. 5 illustrates an exemplary bitmap of the word "Lapdog" in accordance with one embodiment.
Figure 6:
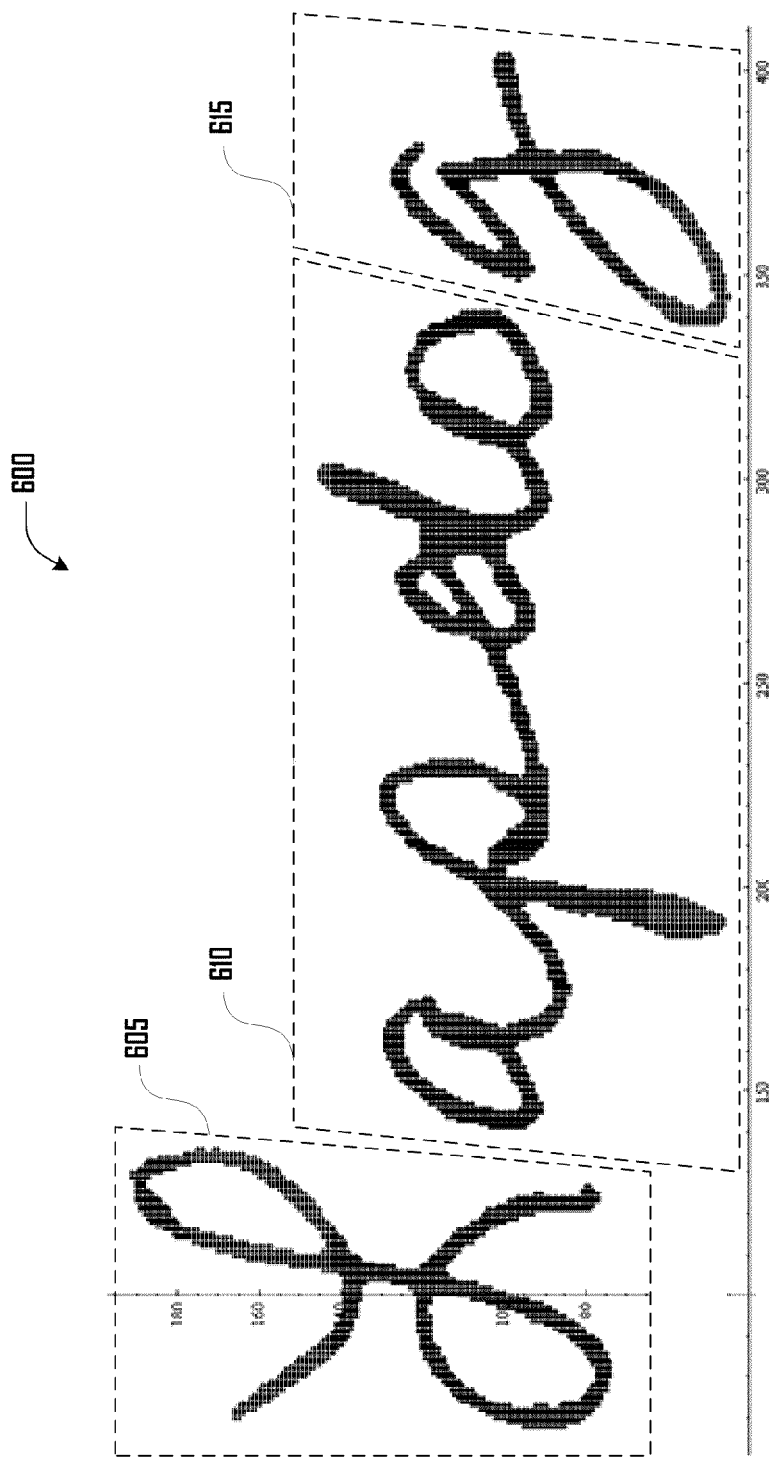
FIG. 6 illustrates a down-sampled and filtered bitmap in accordance with one embodiment.

FIG. 5 illustrates an exemplary bitmap 500 of the word "Lapdog," which illustrates artifacts including scatter 505A-C, which are small isolated sets of "on" pixels, and hole 510, which is a small isolated interior set of "off" pixels. FIG. 6 illustrates bitmap 600, which is a down-sampled and filtered version of bitmap 500.

Referring again to FIG. 4, in block 415, unconnected or disjoint components of the processed bitmap are identified. In one embodiment, unconnected or disjoint components of the processed bitmap are identified by finding the connected components of the grid graph corresponding to the processed bitmap. As illustrated in FIG. 6, three disjoint components 605, 610, and 615 may be identified in bitmap 600.

Figure 7:
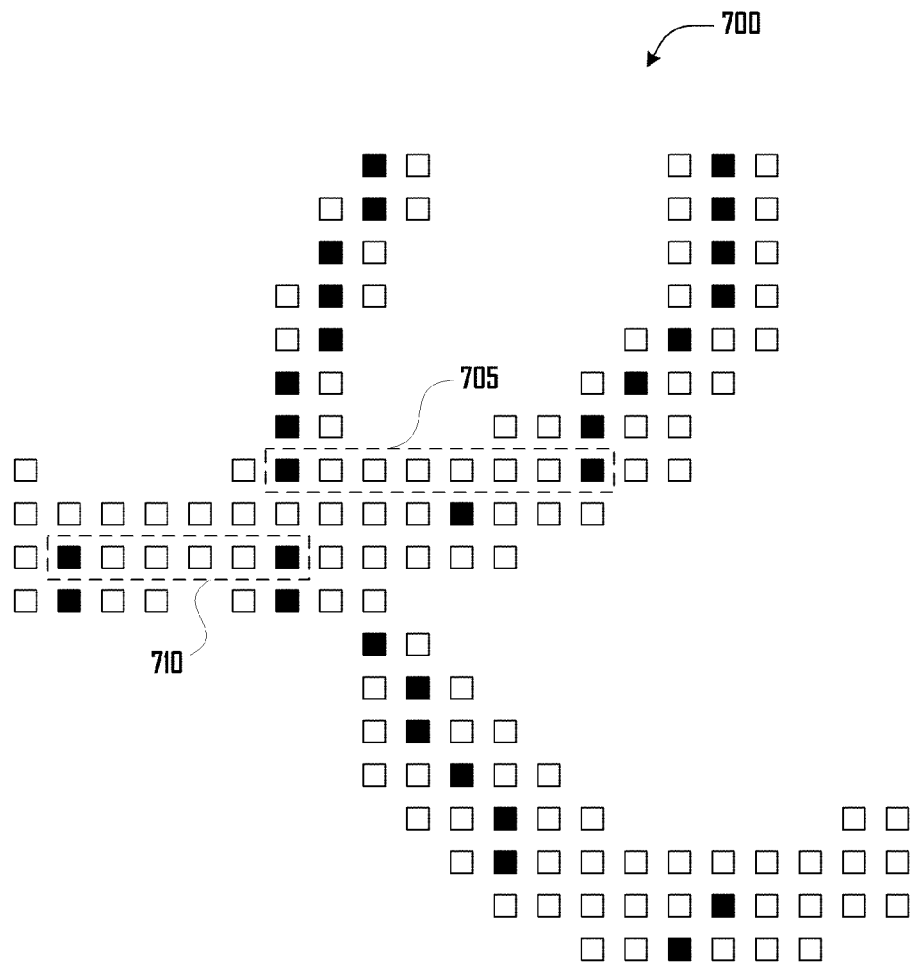
FIG. 7 illustrates a pixel pattern in accordance with one embodiment.

Beginning in block 420, subroutine 400 processes each identified disjoint component. In block 425, subroutine 400 skeletonizes the current disjoint component. In one embodiment, a skeletonization process may comprise a thinning routine specifically tailored for word segmentation. In other embodiments, thinning routines that are not specifically tailored may be employed. In an illustrative embodiment, the skeletonization process comprises two stages. In stage one of the illustrative skeletonization process, the approximate rise and fall in ligatures between adjacent glyphs in a component are located, for example, by scanning the image from top to bottom and determining the median pixel in each horizontal line of pixels. For example, as illustrated in FIG. 7, each solid-black box outside dashed rectangles 705 and 710 in pixel pattern 700 represents the location of the median pixel for the corresponding line segment. Dashed rectangles 705 and 710 each indicate a change in topology. For dashed rectangle 705, two distinct line segments have joined, in which case the illustrative thinning routine extends the solid-black pixels from the two pixel segments downward one pixel. For dashed rectangle 710, a single segment is about to split into two line segments, in which case the solid-black pixels or medians of the two lower line segments are extended upward one pixel.

Figure 8:
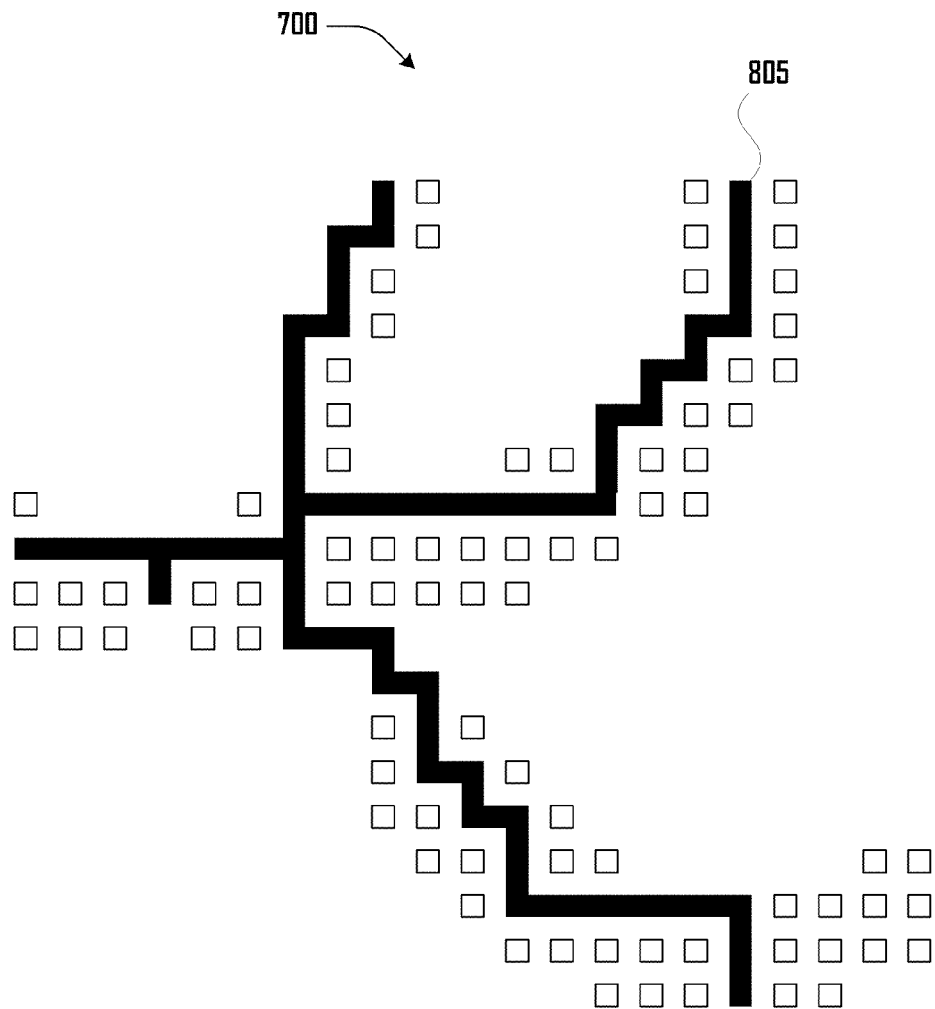
FIG. 8 illustrates rectangular connections in a pixel pattern in accordance with one embodiment.

In the second stage of the illustrative skeletonization process, the skeletonization process finds rectangular connections between the solid-black pixels determined in stage one. In the illustrative routine, a rectangular connection is a non-diagonal edge between two adjacent nodes or pixels. In finding rectangular connections, the illustrative skeletonization process generates a rectangular or grid graph, in which the solid-black pixels become part of the node set of the graph and are connected by edges. FIG. 8 illustrates rectangular connections 805 derived from the solid-black pixels identified in pixel pattern 700.

Figure 9:
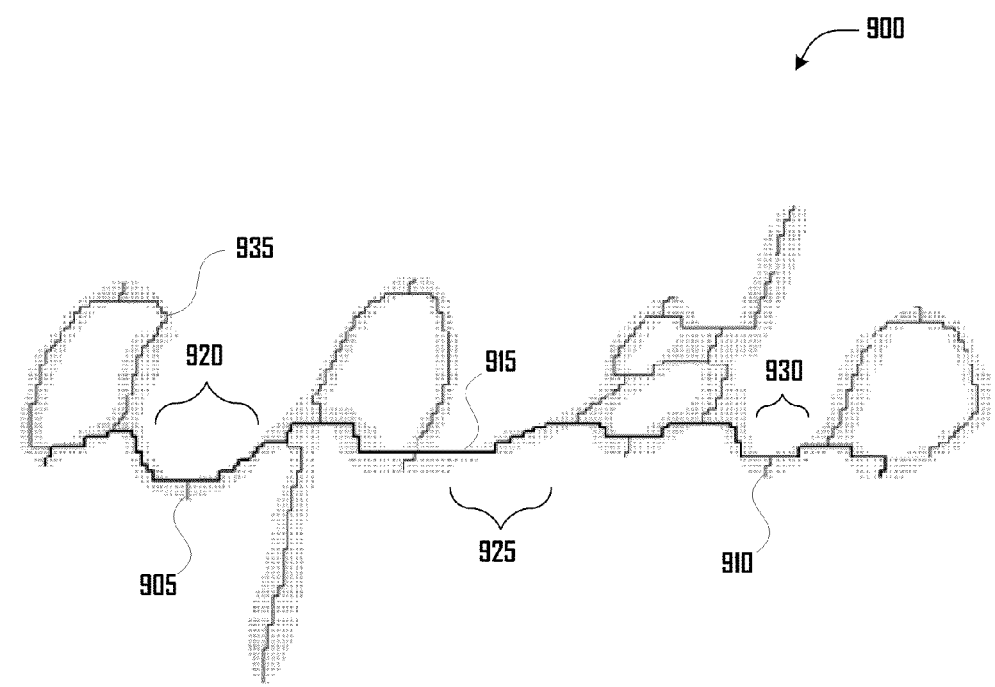
FIGS. 9-10 illustrate a skeletonized bitmap in accordance with one embodiment.

This grid graph is also referred to as the thin skeleton. As illustrated in FIG. 9, the thin skeleton 935 captures topological information inherent in the original component image. For example, the illustrative thinning process captures the short tails 905, 910 rising and falling in the ligatures 920, 930 between the "a" and "p" and the "d" and "o."

Referring again to FIG. 4, in block 430, the thin skeleton is used to generate a connected path or thick black path through the component image, the connected path traversing the ligatures connecting the glyphs from left to right. FIG. 9 also illustrates a connected path 915 through the component image, the connected path 915 traversing ligatures 920, 925, 930 connecting the glyphs from left to right.

Figure 10:
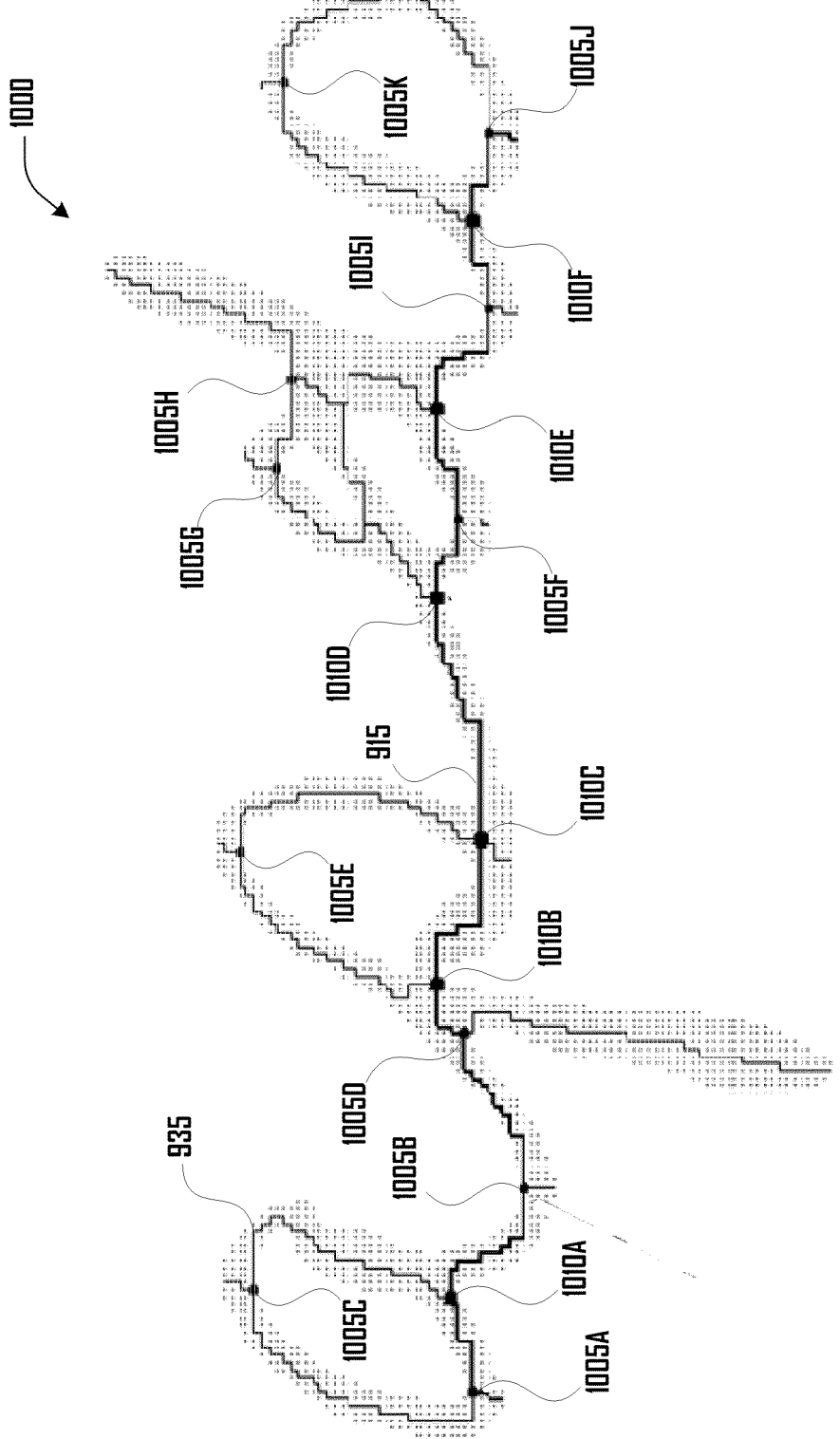

Referring again to FIG. 4, in block 435, some or all nodes of the thin skeleton that are not merely connecting nodes (i.e. nodes with three or more paths) are classified according to type and location. In the illustrative embodiment, such nodes are classified as either Real or Pseudo. In one embodiment, Real nodes generally indicate the presence of a connection between distinct sections of the image. Turning points are frequently found near Pseudo nodes so that Pseudo nodes may indicate the presence of a ligature. In other embodiments, other classifications may be used. FIG. 10 illustrates Real nodes 1010A-F on connected path 915 and Pseudo nodes 1005A-J on connected path 915 and thin skeleton 935.

Figure 11:
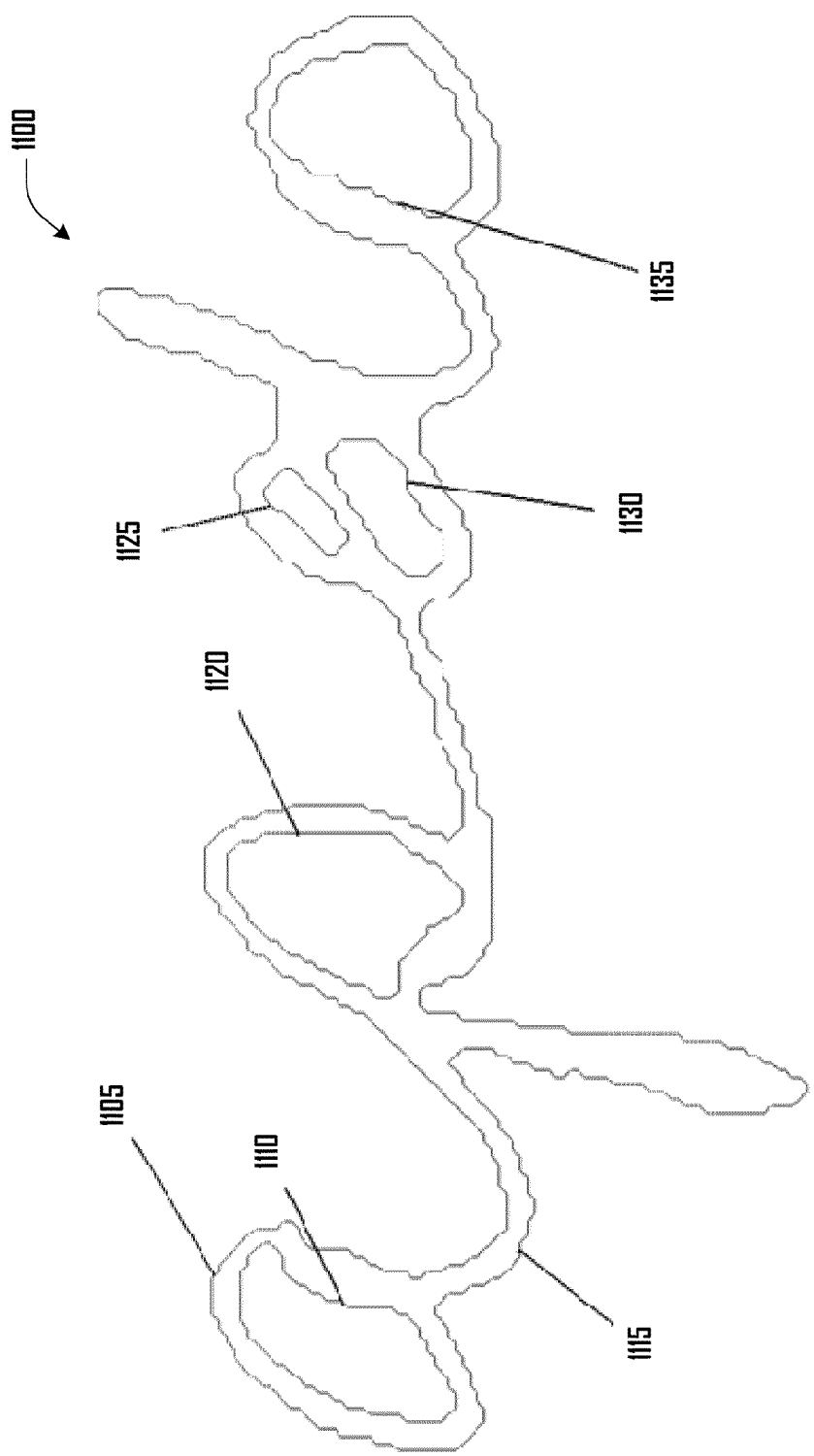
FIG. 11 illustrates connected graphs derived from a skeletonized bitmap in accordance with one embodiment.

Referring again to FIG. 4, in block 440, an edge detection routine detects edge sets of "on" pixels in the image component and generates connected graphs of some or all such boundaries in the component image. In block 445, the connected graphs are classified according to their relative locations. For example, as illustrated in FIG. 11, connected graphs 1105-1135 are classified as upper main coast 1105, lower main coast 1115, or as individual interior coasts 1110, 1120, 1125, 1130, 1135. In other embodiments, other classifications may be used, or connected graphs may not be classified.

In some embodiments, Real nodes and Pseudo nodes may also be classified according to location. For example, a real or pseudo node may lie on the outer coast of the image or on an inland coast or be an interior point.

Referring again to FIG. 4, in block 450, the component image is traversed along the corresponding connected path, and information gleaned from the node classifications (if any) and edge sets is used to judiciously section the component image into non-overlapping segments. As a component is traversed in the illustrative embodiment, trial cuts are made at or near some or all Real or Pseudo nodes along the connected path. Exemplary criteria for accepting a trial cut include a sufficiently large horizontal distance traveled from the last accepted cut, and whether the cut extends from the upper to lower main coast. In other embodiments, other criteria may be employed.

Figure 12:
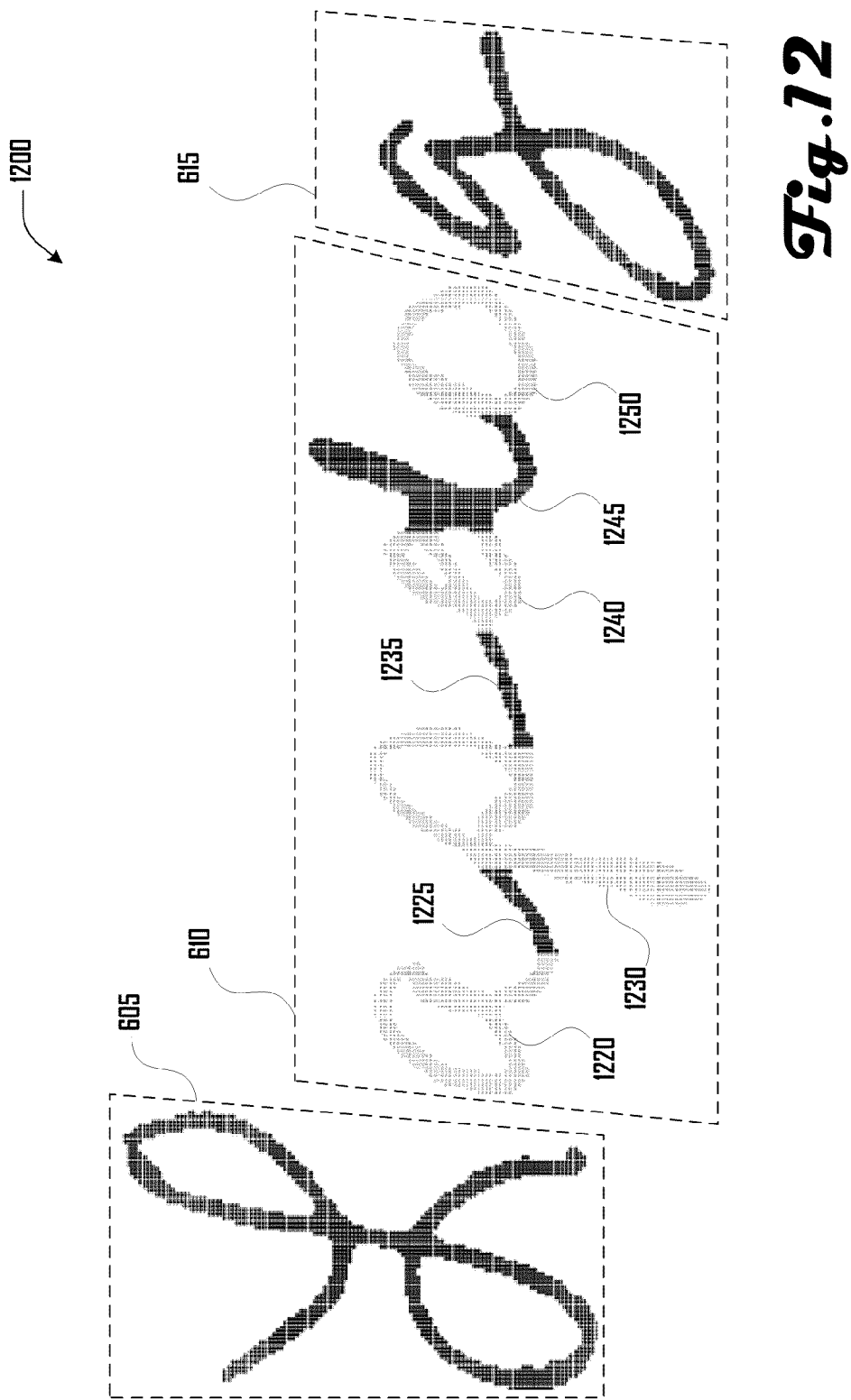
FIG. 12 illustrates segmented components within a bitmap in accordance with one embodiment.

As illustrated in FIG. 12, components 605 and 615 (i.e. "L" and "g") have been sectioned by the illustrative segmentation process into single segments, while component 610 has been partitioned into seven segments 1220-1250. In FIG. 12, segments 1220-1250 are depicted in alternating light and dark shades merely for the purposes of visualization.

Figure 13:
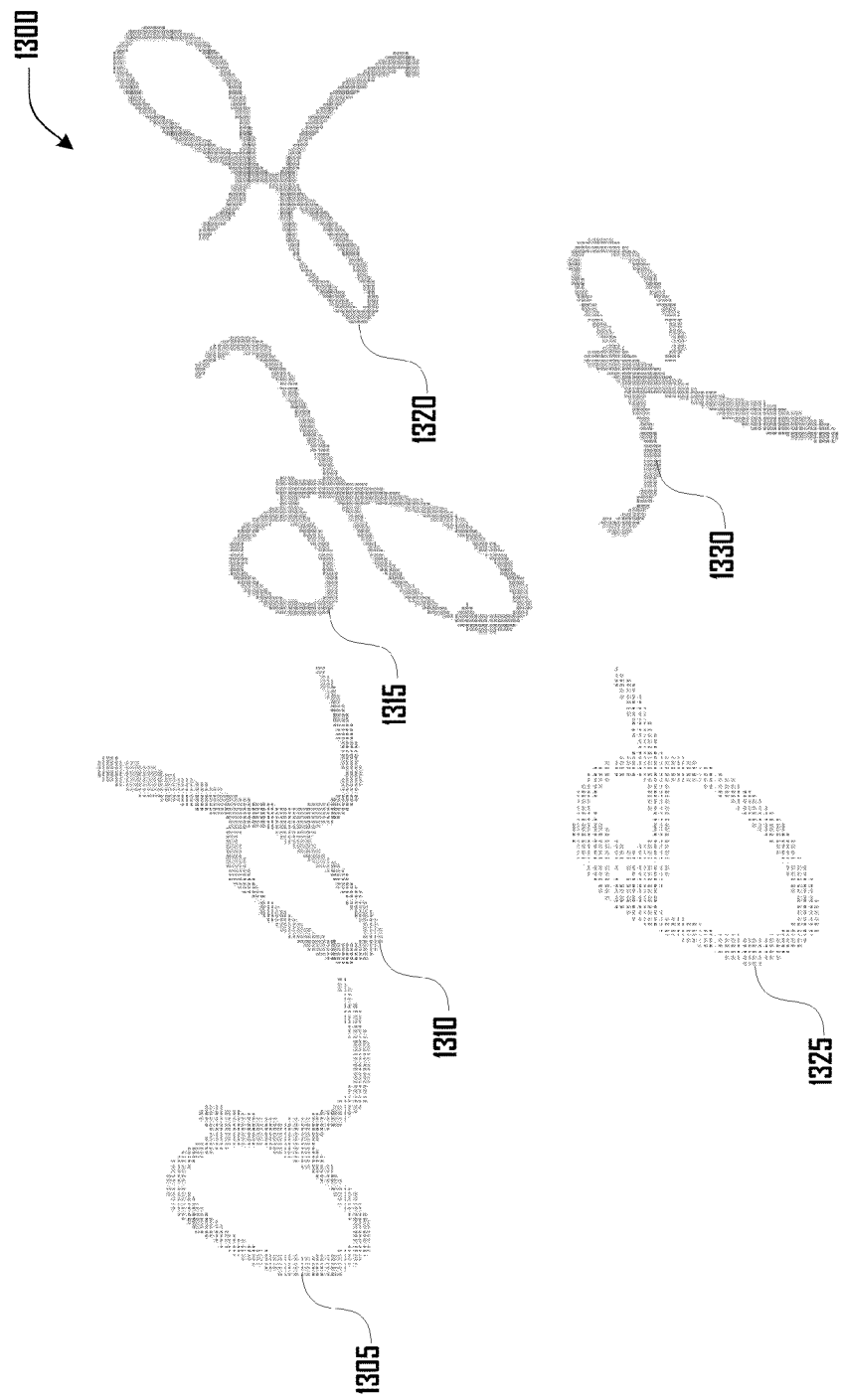
FIG. 13 shows illustrative exemplars for the six glyphs making up the word "Lapdog" in accordance with one embodiment.

Referring again to FIG. 4, beginning in block 455, patterns are recognized within sets of adjacent segments. For each character in the letter, word, or text represented by the current disjoint component, in block 460, some or all sets of adjacent segments may be determined and compared with an image of a corresponding exemplar, which may be provided by the individual, and the best match determined. (FIG. 13 shows illustrative exemplars for the six glyphs 1305-1330 making up the word "Lapdog.")

In one embodiment, the pattern recognition routine is based on a generalized minimum distance, which can be considered to be a variation on the notion of Hausdorff metric between two compact subsets of a metric space. In other embodiments, other pattern recognition routines may be used. The illustrative pattern recognition routine is now briefly summarized.

Let eS denote the zero set of a bit map of an image taken to be the exemplar and let tS denote the bit map of a test or comparison image.

For each zero set, an ordered set may be found from a complementary normalized zero set close to the normalized zero set in the following sense. Let the normalized zero set be that of the exemplar eS. Find a point $tS_{Min}(u_i)$ from tSN closest to for every point $u_i$ in eSN. Repeating this process for the normalized test zero set tSN, the following sets are obtained:

$$tS_{Min} = \left\{ tS_{Min}(u_i) = \min_{v \in tSN} \|u_i - v\|_2 \,\middle|\, u_i \in eSN, \right. \qquad \text{Equation 1.}$$
$$\left. i = 1, \ldots, \text{card}(eSN) \right\}$$

$$eS_{Min} = \{ eS_{Min}(u_i) = \min_{v \in eSN} \|u_i - v\|_2 \mid u_i \in tSN, \qquad \text{Equation 2.}$$
$$i = 1, \ldots, \text{card}(tSN) \}.$$

Continuing to describe the illustrative pattern recognition routine, two affine mappings may be generated, $T_{eS}$ and $L_{tS}$, one for the exemplar and the other for the test zero set. Together, the two affine mappings minimize a particular sum of squares objective function H, described below. The illustrative affine mapping T has the general form $$T(x_S, y_S, \theta, o_x, o_y, s_x, s_y) = \begin{pmatrix} T_{x,1} & T_{y,1} \\ T_{x,2} & T_{y,2} \end{pmatrix} \qquad \text{Equation 3.}$$
$$= A \begin{pmatrix} x \\ y \end{pmatrix} + \begin{pmatrix} o_x \\ o_y \end{pmatrix}$$

where $$A = A_{Vertical\ shear} A_{Horizontal\ shear} A_{scale} A_{Rotation} \qquad \text{Equation 4.}$$

$$A_{Vertical\ shear} = \begin{pmatrix} 1 & s_x \\ 0 & 1 \end{pmatrix} \qquad \text{Equation 5.}$$

$$A_{Horizontal\ shear} = \begin{pmatrix} 1 & 0 \\ s_y & 1 \end{pmatrix} \qquad \text{Equation 6.}$$

-continued $$A_{Scale} = \begin{pmatrix} x_S & 0 \\ 0 & y_S \end{pmatrix}$$ Equation 7.

$$A_{Rotation} = \begin{pmatrix} \cos(\theta) & -\sin(\theta) \\ \sin(\theta) & \cos(\theta) \end{pmatrix}$$ Equation 8.

The illustrative affine mapping T applies shear, scaling, rotation and translation to a point (x,y) and requires seven parameters to be completely specified. In other embodiments, more, fewer, and/or different parameters may specify an alternate affine mapping T.

In one embodiment, the objective function to be minimized is as follows:

$$H(x_{S_e}, y_{S_e}, \theta_e, o_{x_e}, o_{y_e}, s_{x_e}, s_{y_e}, x_{S_t}, y_{S_t}, \theta_t, o_{x_t}, o_{y_t}, s_{x_t}, s_{y_t}) = \alpha\{F(x_{S_e}, y_{S_e}, \theta_e, o_{x_e}, o_{y_e}, s_{x_e}, s_{y_e}) + G(x_{S_t}, y_{S_t}, \theta_t, o_{x_t}, o_{y_t}, s_{x_t}, s_{y_t})\}$$ Equation 9.

where $\alpha = 0.005$ and $$F(x_{S_e}, y_{S_e}, \theta_e, o_{x_e}, o_{y_e}, s_{x_e}, s_{y_e}) = \frac{1}{\text{card}(eSN)} \sum_{u_i = \binom{x_i}{y_i} \in eSN} \|u_i - T^e tS_{Min}(u_i)\|_2^2$$ Equation 10.

$$G(x_{S_t}, y_{S_t}, \theta_t, o_{x_t}, o_{y_t}, s_{x_t}, s_{y_t}) = \frac{1}{\text{card}(tSN)} \sum_{u_i = \binom{x_i}{y_i} \in tSN} \|u_i - T^t eS_{Min}(u_i)\|_2^2.$$ Equation 11.

In particular, $$F(x_{S_e}, y_{S_e}, \theta_e, o_{x_e}, o_{y_e}, s_{x_e}, s_{y_e}) = \frac{1}{\text{card}(eSN)} \sum_{u_i = \binom{x_i}{y_i} \in eSN} (x_i - (T^e_{x,1} \; T^e_{y,1}) tS_{Min}(u_i))^2 + (y_i - (T^e_{x,2} \; T^e_{y,2}) tS_{Min}(u_i))^2$$ Equation 12.

$$F(x_{S_e}, y_{S_e}, \theta_e, o_{x_e}, o_{y_e}, s_{x_e}, s_{y_e}) = \frac{1}{\text{card}(eSN)}$$ Equation 13.

$$\sum_{u_i = \binom{x_i}{y_i} \in eSN} \left\{ \begin{pmatrix} x_i - o_{x_e} - x_{S_e} p_i \cos(\theta_e) - \\ y_{S_e} q_i s_{x_e} \cos(\theta_e) - \\ x_{S_e} p_i s_{x_e} s_{y_e} \cos(\theta_e) + x_{S_e} q_i \sin(\theta_e) - \\ y_{S_e} p_i s_{x_e} \sin(\theta_e) + x_{S_e} q_i s_{x_e} s_{y_e} \sin(\theta_e) \end{pmatrix}^2 + \begin{pmatrix} y_i - o_{y_e} - y_{S_e} q_i s_{x_e} \cos(\theta_e) - \\ x_{S_e} p_i s_{y_e} \cos(\theta_e) - \\ y_{S_e} p_i \sin(\theta_e) + x_{S_e} q_i s_{y_e} \sin(\theta_e) \end{pmatrix}^2 \right\}$$

and $$\begin{pmatrix} p_i \\ q_i \end{pmatrix} = tS_{Min}(u_i)$$ Equation 14.

where $$u_i = \begin{pmatrix} x_i \\ y_i \end{pmatrix} \in eSN$$ Equation 15.

Continuing to describe the illustrative pattern recognition routine, the objective function H is minimized. The optimal parameters $x_{S_t}, y_{S_t}, \theta_t, o_{x_t}, o_{y_t}, s_{x_t}, s_{y_t}$, and $x_{S_e}, y_{S_e}, \theta_e, o_{x_e}, o_{y_e}, s_{x_e}, s_{y_e}$ are then employed in the affine mapping to transform, respectively, eSN and tSN to $$e\hat{S}N = T(x_{S_t}, y_{S_t}, \theta_t, o_{x_t}, o_{y_t}, s_{x_t}, s_{y_t}) eSN$$ Equation 16.

$$t\hat{S}N = T(x_{S_e}, y_{S_e}, \theta_e, o_{x_e}, o_{y_e}, s_{x_e}, s_{y_e}) tSN.$$ Equation 17.

In one embodiment, the illustrative pattern recognition routine is then iterated until an increase in the objective function minimum is detected. In one embodiment, three iterations may be utilized, but more or fewer iterations may be used in other embodiments.

FIG. 14 illustrates one possible simulation with the illustrative pattern recognition routine for the word "Lapdog." From the fact that there are nine non-overlapping segments for the three-disjoint-component six-glyph word, there are only 20 ordered sets out of a total of 56 to examine. The first ordered set considered is Ordered Set 4={{1}, {2}, {3}, {4}, {5,6,7,8}, {9}} which indicates that glyph 1 ("L") is represented by segment 1, glyph 2 ("a") by segment 2, glyph 3 ("p") by segment 3, glyph 4 ("d") by segment 4, glyph 5 ("o") by segments 5,6,7,8 and glyph 6 ("g") by segment 9. The set of dissimilarity measures for this ordered set is determined by the routine to be {0.703292, 1.0673, 339.052, 1.19132, 3.7673, 0.497561}. According to the simulation illustrated in FIG. 14, all choices are reasonably good except for the representation of glyph "p" by segment 3, which is two orders of magnitude larger than the rest.

Figure 15:
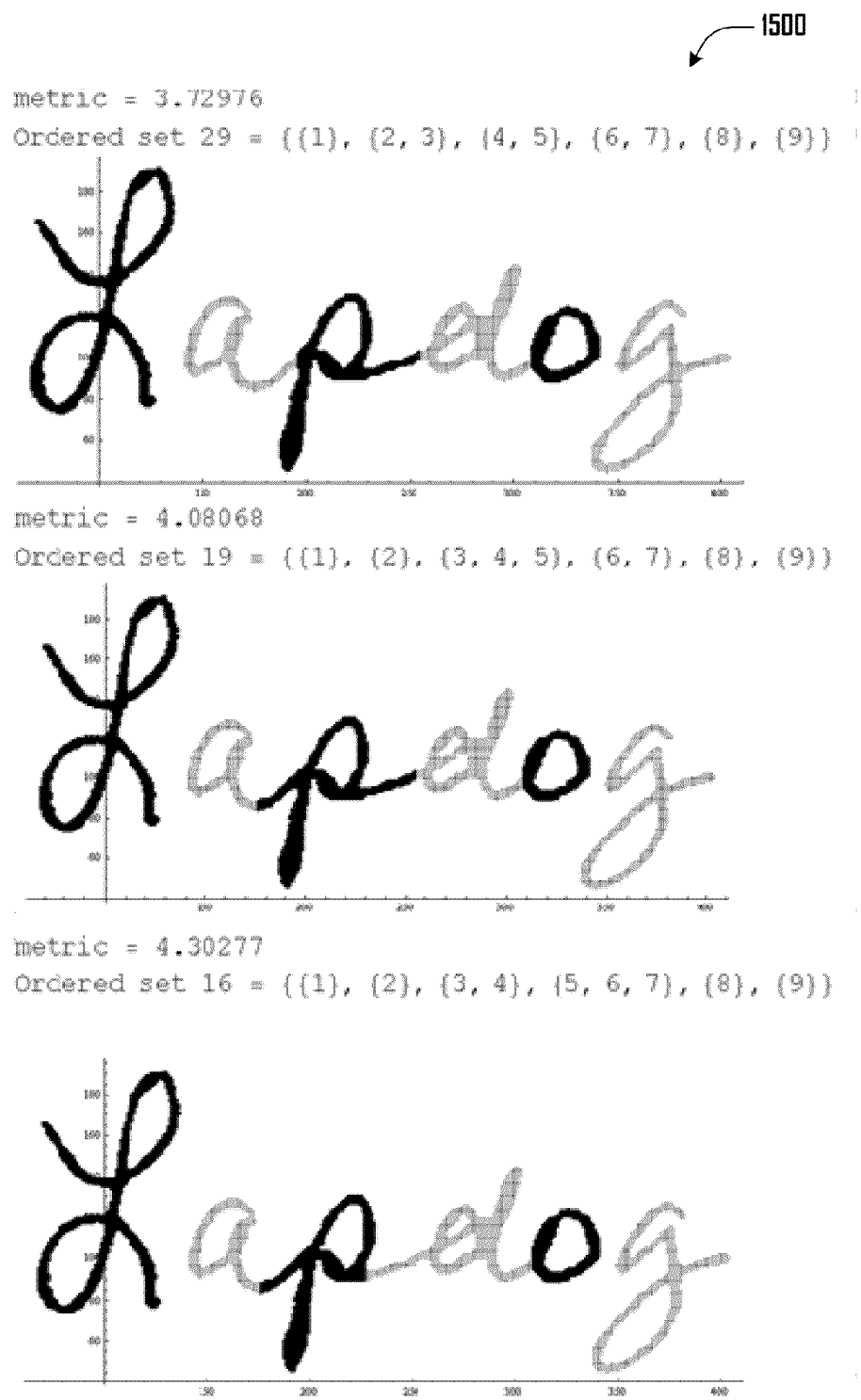
Figure 16:
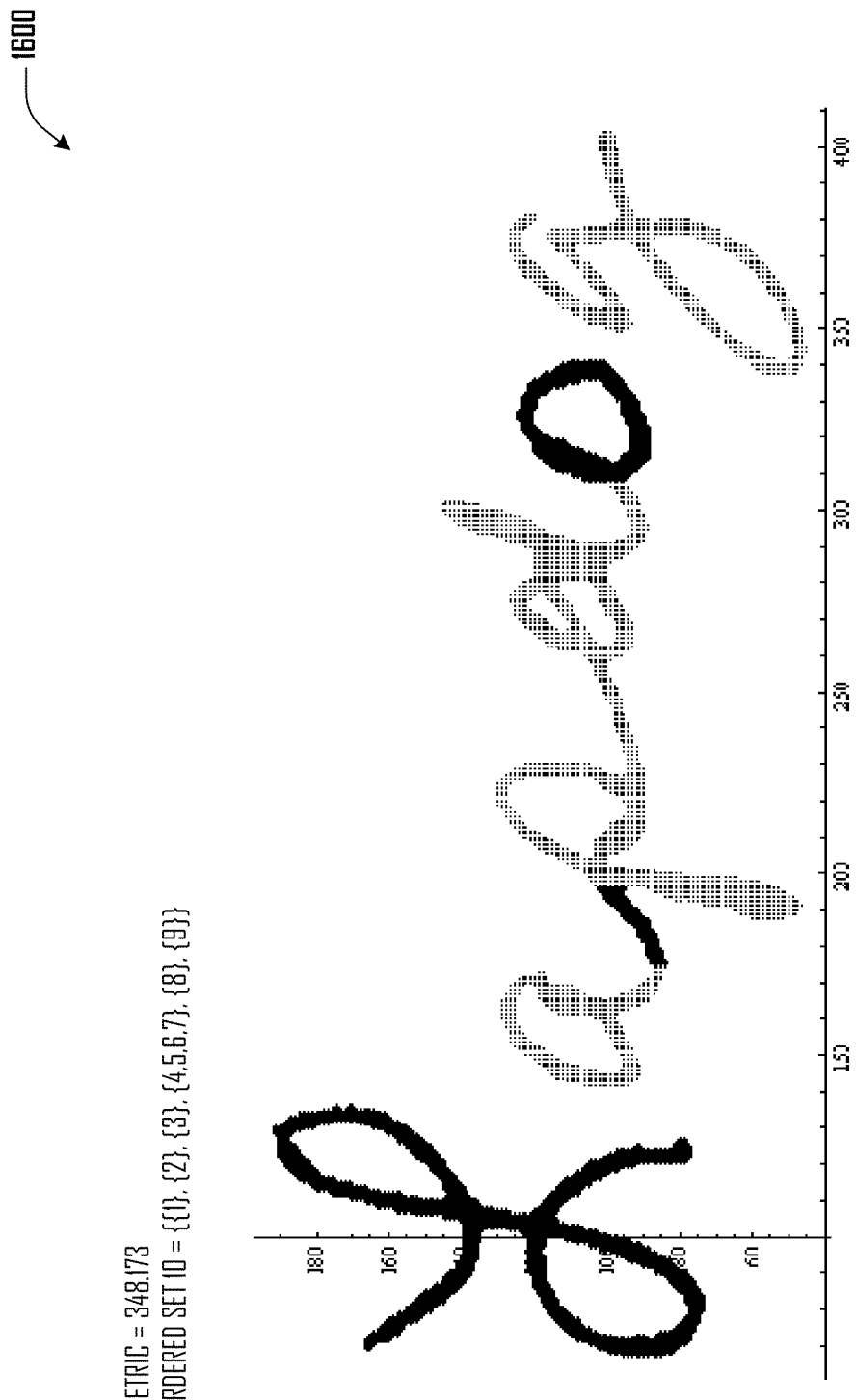

FIG. 15 depicts several ordered sets with small dissimilarity measures for the handwritten word "Lapdog" as determined by the illustrative pattern recognition routine. FIG. 16 depicts an ordered set with large dissimilarity measures for the handwritten word "Lapdog" as determined by the illustrative pattern recognition routine.

Referring again to FIG. 4, once a set of one or more adjacent non-overlapping segments have been determined for the current character, the set is stored as a representation of the corresponding glyph. In one embodiment, the set is stored as a member of an ensemble of representations of the corresponding glyph.

In block 470, subroutine 400 cycles back to block 455 to process the next character. In block 475, subroutine 400 cycles back to block 420 to process the next disjoint component. Subroutine 400 returns to the caller in block 499.

Figure 17:
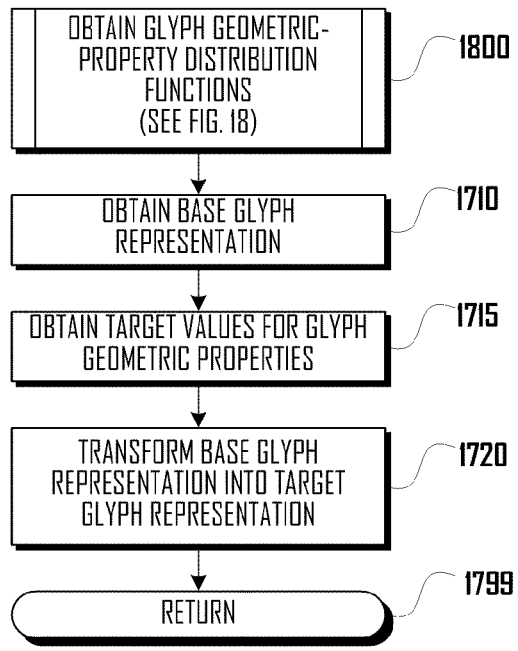
FIG. 17 illustrates a variable glyph transformation subroutine in accordance with one embodiment.

FIG. 17 illustrates a variable glyph transformation subroutine 1700 in accordance with one embodiment. As the term is used herein, a glyph representation includes, but is not limited to a centerline, i.e. a set of points describing the middle or interior of a glyph; a glyph skin, or set of points along the glyph surface; and a set of points comprising the glyph (i.e. the glyph 'bitmap'). As the term is used herein, a base representation of a glyph refers to a representation of the glyph in a two dimensional space. It includes but is not limited to a centerline, i.e. a set of points describing the middle or interior of a glyph; a glyph skin, or set of points along the glyph surface; and a set of point comprising the glyph (i.e. the glyph "bitmap"). The base glyph representation may or may not have originated from a bitmap of a scan of handwritten text. In one embodiment, a linear transform of the form $$x_i \to x_i A + B$$ Equation 18.

is applied to $\{x_i\}$, the set of two dimensional coordinates comprising the representation, yielding a transformed representation of the glyph. Quantities A and b are determined from statistical measurements of geometrical properties from an ensemble of representations of the glyph or similar glyphs. (See FIGS. 18-18, discussed below.) These representations may or may not have originated from a bitmap of a scan of handwritten text. The representations in an ensemble may or may not include the base glyph representation.

In subroutine block 1800 (see FIG. 18, discussed immediately below), subroutine 1700 obtains geometric-property distribution functions corresponding to a glyph to be transformed.

Figure 18:
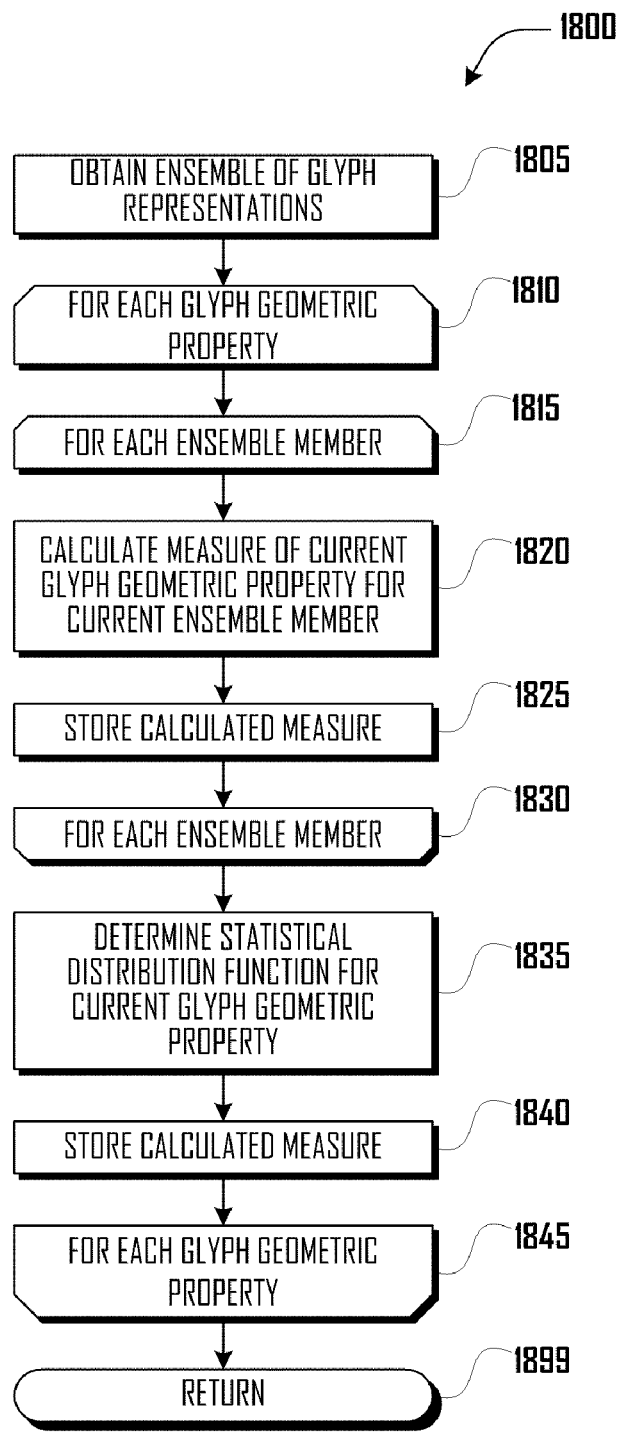
FIG. 18 illustrates a glyph geometric-property distribution-function subroutine in accordance with one embodiment.

FIG. 18 illustrates a glyph geometric-property distribution-function subroutine 1800 in accordance with one embodiment. In block 1805, subroutine 1800 obtains an ensemble of glyph representations. For example, in one embodiment, an ensemble of glyph representations may be obtained via one or more invocations of subroutine 400 (see FIG. 4, discussed above). In some embodiments, an ensemble of glyph representations may be obtained from a store of glyph representations 225.

Beginning in block 1810, one or more glyph geometric properties are processed. In one embodiment, glyph geometry may be specifically defined. In one embodiment, measures that describe glyph geometry include, a glyph position above a baseline, a glyph size, and a glyph orientation.

Beginning in block 1815, each member of the ensemble of glyph representations is processed. In block 1820, subroutine 1800 calculates a measure of the current glyph geometric property for the current member of the ensemble of glyph representations. For example, in one embodiment, one of the following measures may be taken: a measure of the glyph representation's position above a baseline, a measure of the spatial orientation of the glyph representation, and one or more measures of a size of the glyph representation. FIG. 19 illustrates an exemplary set of glyph geometric properties for a base glyph representation 1900.

Glyph Position Above a Baseline

The base glyph representation 1900, as well as any representations in an ensemble of glyph representations, may originate from scans of handwritten text that has been written above a baseline 1925. The position of a glyph representation (e.g. 1900) above the baseline 1905, denoted h, may be defined as $$h = \Sigma(y_i - b)/N \quad \text{Equation 19.}$$

where $\{y_i\}$ are the vertical coordinates of all points in the representation, N is the number of points in the representation, and b is the vertical position of the baseline 1925. Alternative definitions include a root-mean-squared distance above the baseline, i.e.

$$h = \sqrt{\Sigma(y_i - b)^2/N}. \quad \text{Equation 20.}$$

Glyph Size and Orientation

For any two dimensional object, including a glyph representation (e.g. 1900), principal moments of inertia, p1 and p2 (1915 and 1910, respectively), are calculated by diagonalizing the moment of inertia tensor given by $$I = \begin{bmatrix} I_{xx} & I_{xy} \\ I_{yx} & I_{yy} \end{bmatrix} \quad \text{Equation 21.}$$

where $$I_{xx} = \sum y_i^2, I_{yy} = \sum x_i^2. \quad \text{Equation 22.}$$
$$I_{yx} = I_{xy} = \sum x_i y_i,$$

If the original image of the glyph is drawn on a baseline, then the angle 1920 between the baseline and the first principal axis, denoted α, gives a spatial orientation of the representation. The norms of the principal moments, |p1| and |p2|, give a measurement of the size of the representation in the directions of the principal moments of inertia 1915, 1910.

Referring again to FIG. 18, in block 1825, subroutine 1800 at least transiently stores the calculated measure of the current glyph geometric property (e.g., one of h, α, and |p1| and |p2|). In block 1830, subroutine 1800 cycles back to block 1815 to process the next ensemble member (if any).

In block 1835, subroutine 1800 determines a statistical distribution function for the current glyph geometric property. In one embodiment, having determined measures of the current glyph geometric property for each member of the ensemble of glyph representations, subroutine 1800 determines statistical metrics for the ensemble of determined measures, including the mean and the variance. In one embodiment, these statistical metrics may then be used to define distribution functions, such as the Gaussian distributions, that model the distribution of the measures in the ensemble.

In block 1840, subroutine 1800 stores the determined statistical distribution function for the current glyph geometric property. In block 1845, subroutine 1800 cycles back to block 1810 to process the next glyph geometric property (if any). Subroutine 1800 ends in block 1899.

Referring again to FIG. 17, in block 1710, subroutine 1700 obtains a base representation for the glyph to be transformed. In one embodiment, the base representation may originate from a scan or scans of handwritten text. In some embodiments, the base representation may be obtained from a store of glyph representations 225.

In block 1715, subroutine 1700 obtains target values for the glyph geometric properties. In one embodiment, target values of for the glyph geometric properties (e.g., h', α', |p1|' and |p2|') may be determined by sampling from the distribution functions of these measures defined for the glyph representation ensembles.

In block 1720, subroutine 1700 transforms the base glyph representation into a target representation. In one embodiment, a unique transformation in the form of Equation 18 (above) maps the base glyph representation to a target representation that has the desired values for the corresponding geometrical properties. For example, FIG. 19 illustrates an exemplary transformation applied to base glyph representation 1900 yielding a target representation 1900' of the glyph having target values h', α', |p1|' and |p2|' for the corresponding glyph geometric properties.

Referring again to FIG. 17, subroutine 1700 returns to the caller in block 1799.

Although specific embodiments have been illustrated and described herein, it will be appreciated by those of ordinary skill in the art that a whole variety of alternate and/or equivalent implementations may be substituted for the specific embodiments shown and described without departing from the scope of the present invention. This application is intended to cover any adaptations or variations of the embodiments discussed herein.

What is claimed is:

1. A computer-implemented method for processing an image of handwritten text, the method comprising:
   segmenting, by a computing device, the image of handwritten text into at least one disjoint component image corresponding to a plurality of individual glyphs connected by a plurality of ligatures;
   skeletonizing, by said computing device, said disjoint component image into a grid graph comprising a plurality of nodes with at least three paths;
   determining, by said computing device according to said grid graph, a connected path traversing said plurality of ligatures and comprising a subset of said plurality of nodes with at least three paths;
   generating, by said computing device, a plurality of connected graphs corresponding to a plurality of edges in said disjoint component image;
   segmenting, by said computing device, said disjoint component image into a plurality of non-overlapping segments according to said connected path and said plurality of connected graphs; and
   determining, by said computing device, a set of one or more adjacent non-overlapping segments corresponding to each of said plurality of individual glyphs.

2. The method of claim 1, further comprising classifying said plurality of nodes with at least three paths according to at least one of a node-type property and a node-location property.

3. The method of claim 1, further comprising classifying said plurality of connected graphs according to an exterior/interior property.

4. The method of claim 1, wherein sectioning said disjoint component image into said plurality of non-overlapping segments comprises:
   identifying a suitable dividing node within said connected path according to at least one suitability criterion; and
   segmenting said disjoint component image into two of said plurality of non-overlapping segments at said suitable dividing node.

5. The method of claim 4, wherein identifying said suitable dividing node according to at least one suitability criterion comprises determining that a horizontal distance between said suitable dividing node and a previously-identified suitable dividing node meets or exceeds a minimum horizontal-segment-size threshold.

6. The method of claim 4, wherein identifying said suitable dividing node according to at least one suitability criterion comprises determining that a dividing line between said two of said plurality of non-overlapping segments extends between an upper coast and a lower coast of said disjoint component image.

7. The method of claim 1, wherein determining a set of one or more adjacent non-overlapping segments corresponding to an individual glyph comprises minimizing a distance metric between a candidate image and a plurality of glyph exemplars, said candidate image comprising said one or more adjacent non-overlapping segments.

8. The method of claim 1, further comprising storing at least one determined set of one or more adjacent non-overlapping segments as a member of an ensemble of representations of the corresponding individual glyph.

9. The method of claim 8, further comprising:
   for each of a plurality of geometric glyph properties:
      calculating a measure of the current geometric glyph property for said member of said ensemble;
      defining a statistical distribution function of the current geometric glyph property for said ensemble; and
      obtaining a target value for the current geometric glyph property according to the current statistical distribution function; and
   transforming a base representation of the corresponding individual glyph into a target representation of the corresponding individual glyph according to the target values obtained for each of said plurality of geometric glyph properties.

10. A computer-readable storage medium having stored thereon instructions that, when executed by a processor, perform the method of claim 1.

11. An apparatus comprising a processor and a memory, the memory having stored thereon instructions that, when executed by the processor, perform the method of claim 1.

12. A computer-implemented method for varying glyph geometry, the method comprising:
   obtaining, by a computing device, an ensemble of representations of a glyph;
   for each of a plurality of geometric glyph properties:
      calculating, by said computing device, a measure of the current geometric glyph property for each member of said ensemble of representations of said glyph;
      defining, by said computing device, a statistical distribution function of the current geometric glyph property for said ensemble of representations of said glyph; and
      obtaining, by said computing device, a target value for the current geometric glyph property according to the current statistical distribution function;
   obtaining, by said computing device, a base representation of said glyph; and
   transforming, by said computing device, said base representation of said glyph into a target representation of said glyph according to the target values obtained for each of said plurality of geometric glyph properties.

13. The method of claim 12, wherein said plurality of geometric glyph properties includes at least two of a glyph position-above-a-baseline property, a glyph size property, and a glyph orientation property.

14. The method of claim 12, wherein said plurality of geometric glyph properties includes a glyph size property, and wherein calculating a measure of said glyph size property comprises calculating a first and a second principal moment of inertia of a member of said ensemble of representations of said glyph.

15. The method of claim 14, wherein said plurality of geometric glyph properties includes a glyph orientation property, and wherein calculating a measure of said glyph orientation property comprises calculating an angle between said first principal moment of inertia and a baseline.

16. The method of claim 12, wherein said plurality of geometric glyph properties includes a glyph position-above-a-baseline property, and wherein calculating a measure of said glyph position-above-a-baseline property comprises summing a plurality of values corresponding to a plurality of vertical coordinates, relative to a baseline, of a plurality of points that comprise a member of said ensemble of representations of said glyph.

17. The method of claim 12, wherein obtaining said base representation of said glyph comprises selecting one from said ensemble of representations of said glyph.

18. The method of claim 12, wherein obtaining said ensemble of representations of said glyph comprises:

segmenting an image of handwritten text into at least one disjoint component image corresponding to a plurality of individual glyphs connected by a plurality of ligatures;

sectioning said disjoint component image into a plurality of non-overlapping segments; and determining a set of one or more adjacent non-overlapping segments corresponding to each of said plurality of individual glyphs.

19. The method of claim 18, wherein sectioning said disjoint component image into said plurality of non-overlapping segments comprises:

skeletonizing said disjoint component image into a grid graph comprising a plurality of nodes with at least three paths;

determining, according to said grid graph, a connected path traversing said plurality of ligatures and comprising a subset of said plurality of nodes with at least three paths; and generating, by said computing device, a plurality of connected graphs corresponding to a plurality of edges in said disjoint component image.

20. A computer-readable storage medium having stored thereon instructions that, when executed by a processor, perform the method of claim 12.

21. An apparatus comprising a processor and a memory, the memory having stored thereon instructions that, when executed by the processor, perform the method of claim 12.

* * * * *